United States Patent
Patil et al.

(10) Patent No.: US 11,543,504 B2
(45) Date of Patent: Jan. 3, 2023

(54) PHASE COMPENSATION IN A TIME OF FLIGHT SYSTEM

(71) Applicant: TEXAS INSTRUMENTS INCORPORATED, Dallas, TX (US)

(72) Inventors: Bharath Patil, Bangalore (IN); Anjana Sharma, Bangalore (IN); Subhash Chandra Venkata Sadhu, Bangalore (IN); Ravishankar Ayyagari, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 356 days.

(21) Appl. No.: 16/855,287

(22) Filed: Apr. 22, 2020

(65) Prior Publication Data

US 2020/0249331 A1 Aug. 6, 2020

Related U.S. Application Data

(63) Continuation of application No. 15/729,060, filed on Oct. 10, 2017, now Pat. No. 10,663,566, which is a continuation of application No. 14/642,289, filed on Mar. 9, 2015, now abandoned.

(30) Foreign Application Priority Data

Mar. 10, 2014 (IN) .......................... 1200/CHE/2014

(51) Int. Cl.
*G01S 7/497* (2006.01)
*G01S 17/36* (2006.01)
*G01S 17/894* (2020.01)

(52) U.S. Cl.
CPC .............. *G01S 7/497* (2013.01); *G01S 17/36* (2013.01); *G01S 17/894* (2020.01)

(58) Field of Classification Search
CPC ... G11C 7/1003; G11C 7/222; G06F 13/4072; H04L 7/0008; H04L 7/02; G01C 3/08
See application file for complete search history.

(56) References Cited

U.S. PATENT DOCUMENTS

| 6,987,823 B1 * | 1/2006 | Stark | G11C 7/1003 327/141 |
| 2010/0123895 A1 * | 5/2010 | Reiner | G01S 7/484 356/5.01 |
| 2016/0116592 A1 * | 4/2016 | Hiromi | G06F 3/0304 345/156 |

* cited by examiner

*Primary Examiner* — Luke D Ratcliffe
(74) *Attorney, Agent, or Firm* — John R. Pessetto; Frank D. Cimino

(57) ABSTRACT

Systems and methods are provided for imaging a surface via time of flight measurement. An illumination system includes an illumination driver and an illumination source and is configured to project modulated electromagnetic radiation to a point on a surface of interest. A sensor system includes a sensor driver and is configured to receive and demodulate electromagnetic radiation reflected from the surface of interest. A temperature sensor is configured to provide a measured temperature representing a temperature at one of the illumination driver and the sensor driver and located at a position remote from the one of the illumination driver and the sensor driver. A compensation component is configured to calculate a phase offset between the illumination system and the sensor system from at least the measured temperature and a model representing transient heat flow within the system.

8 Claims, 6 Drawing Sheets

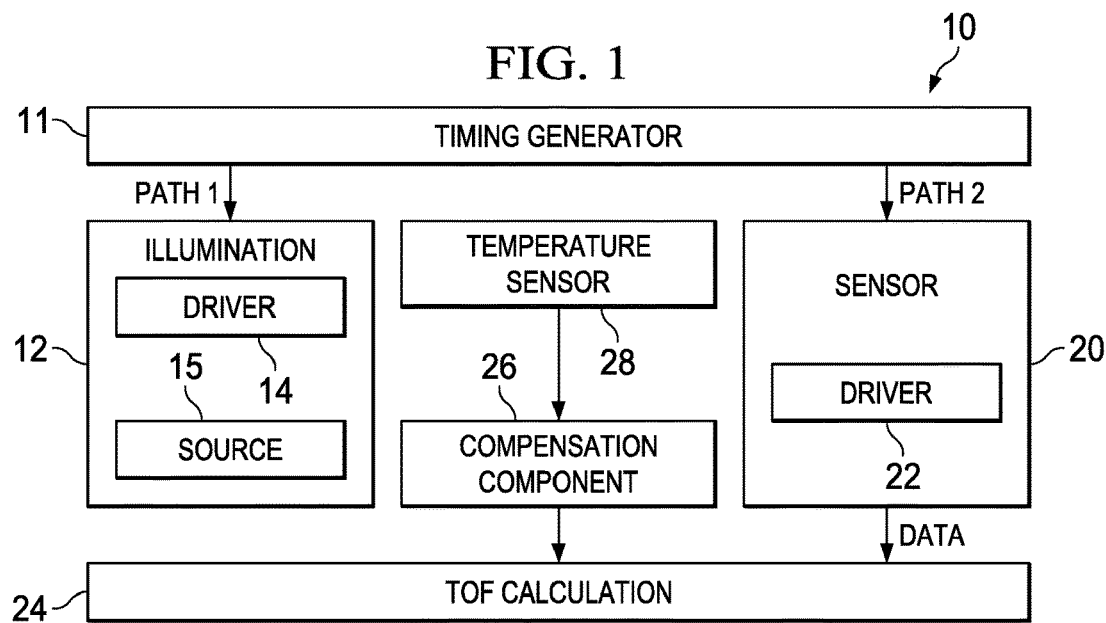
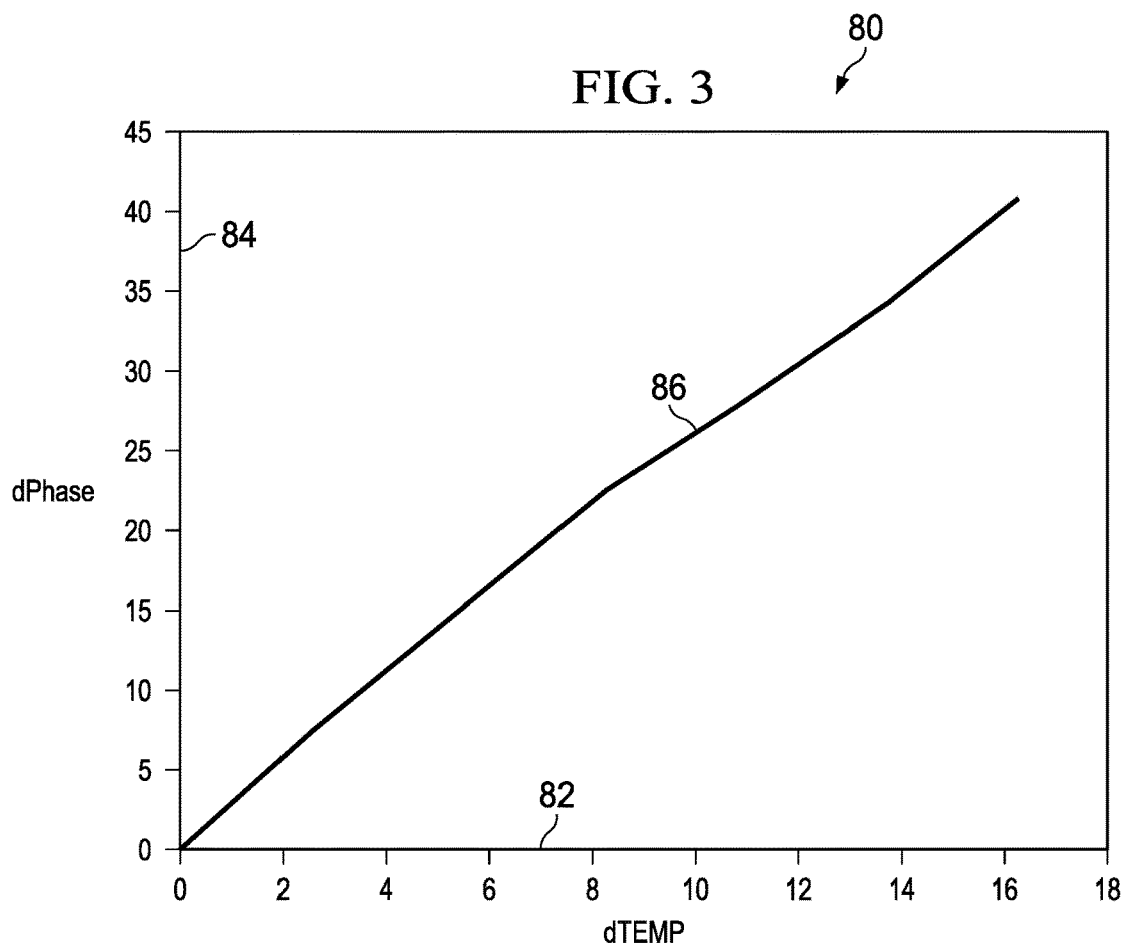

PHASE COMPENSATION IN A TIME OF FLIGHT SYSTEM

CROSS-REFERENCE TO RELATED APPLICATIONS

This continuation application claims priority to U.S. patent application Ser. No. 15/729,060, filed Oct. 10, 2017, which application claims priority to U.S. patent application Ser. No. 14/642,289, filed Mar. 9, 2015, (now abandoned), which application claims priority to Indian provisional patent application No. 1200/CHE/2014, filed Mar. 10, 2014, all of which are incorporated herein by reference in their entirety.

TECHNICAL FIELD

This application relates generally to imaging systems, and more specifically, to phase compensation in a time of flight system.

BACKGROUND

A time-of-flight camera (ToF camera) is a range imaging camera system that resolves distance based on the known speed of light, measuring the time-of-flight of a light signal between the camera and the subject for each point of the image. A time-of-flight camera generally includes an illumination unit that illuminates the subject with light modulated with frequencies up to 100 MHz. The illumination unit normally uses infrared light to make the illumination unobtrusive. A lens can be used to gather the reflected light and images the environment onto an image sensor, with an optical band-pass filter passing only the light with the same wavelength as the illumination unit. This helps suppress non-pertinent light and reduce noise. At the image sensor, each pixel measures the time the light has taken to travel from the illumination unit to the object and back to the sensor. From this time, a distance to the subject at that point can be determined.

SUMMARY

In accordance with one example, a time of flight system is provided. An illumination system includes an illumination driver and an illumination source and is configured to project modulated electromagnetic radiation to a point on a surface of interest. A sensor system includes a sensor driver and is configured to receive and demodulate electromagnetic radiation reflected from the surface of interest. A temperature sensor is configured to provide a measured temperature representing a temperature at one of the illumination driver and the sensor driver and located at a position remote from the one of the illumination driver and the sensor driver. A compensation component is configured to calculate a phase offset between the illumination system and the sensor system from at least the measured temperature and a model representing transient heat flow within the system.

In accordance with another example, a method is provided for determining a distance to a surface of interest with a time of flight system. Modulated electromagnetic radiation is projected on a point on the surface of interest via an illumination system. Electromagnetic radiation reflected from the point on the surface of interest is received at a sensor system. The received electromagnetic radiation is demodulated at the sensor system. A temperature is measured at a position remote from respective drivers associated with each of the illumination system and the sensor system. A phase offset between the illumination system and the sensor system is calculated from at least the measured temperature and a model representing transient heat flow within the system. A location of the point on the surface of interest, relative to the time of flight system, is determined from the received electromagnetic radiation and the calculated phase offset.

In accordance with yet another example, a time of flight system is provided. An illumination system includes an illumination driver and an illumination source is configured to project modulated electromagnetic radiation to a point on a surface of interest. A sensor system includes a sensor driver and is configured to receive and demodulate electromagnetic radiation reflected from the surface of interest. A temperature sensor is configured to provide a measured temperature representing a temperature at one of the illumination driver and the sensor driver and located at a position remote from the one of the illumination driver and the sensor driver. A compensation component is configured to calculate a numerical representation of the time derivative of the measured temperature for at least one time as well as a phase offset between the illumination system and the sensor system. The phase offset is calculated from at least the measured temperature, the calculated time derivative of the measured temperature, and a model representing transient heat flow within the system. A time of flight calculation component is configured to determine a distance to the point of the surface of interest from the demodulated electromagnetic radiation and the phase offset.

BRIEF DESCRIPTION OF THE DRAWINGS

The features, objects, and advantages of the hybrid qubit assembly will become more apparent from the detailed description set forth below when taken in conjunction with the drawings, wherein:

FIG. 1 illustrates an example of a time of flight system;

FIG. 3 illustrates a chart of calibration data obtained for calculating a static coefficient, K;

DETAILED DESCRIPTION

Figure 2:
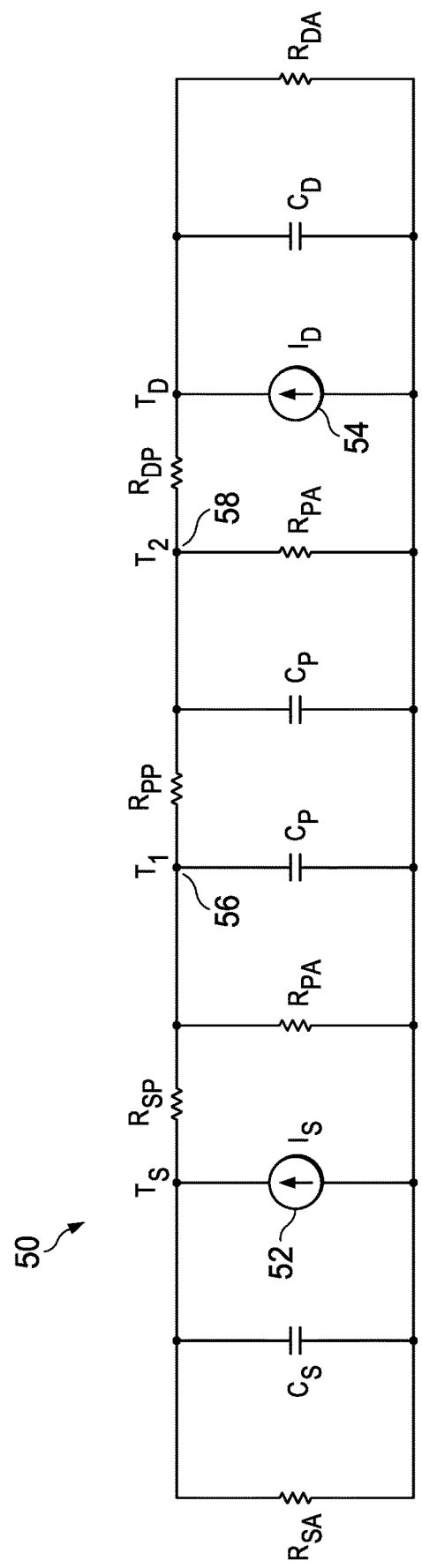
FIG. 2 illustrates an example model of a circuit containing a sensor driver and an illumination driver.

Described herein are systems and methods for maintaining an accurate phase offset in a time of flight imaging system. In a time of flight system, both the illumination unit and the image sensor have to be controlled by high-speed signals, provided by associated driver electronics, and synchronized with high accuracy to maintain to obtain a high resolution. For example, if the signals between the illumination unit and the sensor shift by only ten picoseconds, the measured distance changes by one and a half millimeters. At these levels of precision, changes in the temperature of the system components can affect this timing sufficiently to introduce significant inaccuracies. A correction for any differences in timing between the illumination unit and the image sensor, referred to as a phase offset, can be obtained via a calibration process for a range of expected temperatures.

It can be difficult to directly measure the temperature at the driver electronics, as there will be a finite distance between the driver and the sensor. Accordingly, in the systems described herein, it is assumed that the temperature information used for correction is provided from a location spatially remote from the drivers. When the system has been operating for some length of time, the temperature is relatively constant across the circuitry, and the remote measurement can be relied upon for calculating the phase offset. During a transition in the temperature of these components, as might occur during initiation of the system or when the power provided to the illumination is changed, the temperature at the remote location could vary significantly and nonlinearly from the temperature at the driver. As a result, a system relying solely on the measured temperature can experience significant inaccuracies in the phase offset and the corresponding measurement until a steady state temperature is reached.

FIG. 1 illustrates an example of a time of flight system 10. The system 10 includes an illumination system 12 having an associated illumination driver 14 and an illumination source 15. The illumination system 12 is configured to project electromagnetic radiation, modulated by the illumination driver 14, to a point on a surface of interest. In one example, the illumination source 15 can provide infrared light. After reflecting from the surface of interest, the light is received at a sensor 20, configured to receive and demodulate electromagnetic radiation reflected from the surface of interest. To this end, the sensor 20 includes a sensor driver 22 to demodulate the received electromagnetic radiation and provide the demodulated signal to a time of flight (TOF) calculation component 24. From the time of flight, a distance to the point of the surface of interest can be determined. For example, a difference in the phase of the transmitted signal and the demodulated signal can be determined. From this system, a depth mapping of a region of interest within the surface can be obtained.

Each of the illumination driver 14 and the sensor driver 22 can be provided with a timing reference from a common timing generator 11, although it will be appreciated that small differences in the provided reference can be introduced via differences in the path lengths between the drivers and the timing generator. The accuracy of the time of flight calculation can be affected by any difference in the timing of the illumination system 12 and the sensor 20, and more specifically by differences in the timing their respective drivers 14 and 22. Accordingly, a phase offset between the illumination driver 14 and the sensor driver 22 can be provided to the time of flight calculation component 24 from a compensation component 26 to account for any differences in timing. The phase offset is sensitive to a die temperature of the circuit board or boards containing the illumination driver 14 and the sensor driver 22. When the system 10 has reached a steady state temperature, the phase offset tends to stabilize to a standard value. During transitions, such as starting the system or changing the power of the illumination system 12, the offset value can vary significantly. It will be appreciated that it is undesirable to utilize the standard correction for the system during these times.

In the illustrated system 10, a direct measurement of the temperature at the illumination driver 14 or the sensor driver 22 is not available. Instead, one or more temperature sensors 28, each located remote from each of the illumination driver 14 or the sensor driver 22 but on a same circuit board as one of the drivers 14 and 22, each provide a measured temperature to the compensation component 26. From the measured temperature or temperatures and a transient heat flow model of the system 10, the phase offset can be corrected during transitions, maintaining an accurate time of flight measurement. In one implementation, the transient heat flow model can be a specific instance of a parameterized general model, with a set of parameters for a particular system configuration being determined via curve fitting of the results of a reference circuit board to the general model.

The illustrated system 10 takes into account the transient variation of temperatures rather than just the instantaneous values to calibrate the phase offset, providing faster convergence of the measured value of phase to the correct value. Current time of flight systems sometimes take several minutes to give stable value of phase as the thermal time constants are quite long. The illustrated system converges to the correct phase offset in only a few seconds, allowing the system to remain useful when the power provided to the illumination system 12 is altered or the temperature at the drivers 14 and 22 is otherwise changed.

FIG. 2 illustrates an example model of a circuit 50 containing a sensor driver 52 and an illumination driver 54. It will be appreciated that, while the model is shown as having the sensor driver, the illumination driver, and two temperature sensors, 56 and 58, on a single board, in other implementations, the two drivers and their respective remote temperature sensors can be located on two separate boards. Further, while the offset will depend on the temperature at each of the photosensor driver 52 and the illumination driver 54, for the sake of simplicity of explanation, the following model will focus on the effect of the temperature at the sensor driver on the phase offset. It will be appreciated, however, that the following analysis can be extended in a similar manner to determine the effect of the temperature at the illumination driver 54 on the phase offset. In such a case, the model would likely include additional measured temperatures for at least the second temperate sensor 58, as well as additional parameters, such as thermal time constants for the second temperature sensor 58 and the illumination driver 54. Further, in this specific example, it will be assumed that the sensor associated with the sensor driver 52 is detecting one of infrared, ultraviolet, or visible light. Accordingly, this sensor will be referred to as the "photosensor" to distinguish it from the temperature sensors 56 and 58.

The inventors have determined that, for the illustrated system 50 and similarly configured systems, the relationship between the phase offset and the temperature at the photosensor driver 52 is substantially linear. Specifically, the phase offset due to the temperature at the photosensor driver 52 at a given time, t, can be expressed as:

$$P_0(t) = K(T_S(t) - T_{SC}) \qquad \text{Eq. 1}$$

where $P_0$ is the phase offset, $T_S$ is the photosensor temperature, $T_{SC}$ is the temperature for which the phase offset is calibrated to be zero, and K is a constant static coefficient determined for the system.

The temperature of the photosensor driver will vary from an initial temperature, $T_{S0}$, to a final stable temperature, $T_{SF}$, in an essentially exponential fashion, such that:

$$T_S(t) = T_{SF} + (T_{S0} - T_{SF})e^{-t/\tau_S} \qquad \text{Eq. 2}$$

where $\tau_S$ is a thermal time constant, measured for each system, associated with the temperature change at the photosensor.

From Eqs. 1 and 2, the change in the phase offset over time can be expressed, in terms of the photosensor temperature, as:

$$P_0(t) = K(T_{SF} + [T_{S0} - T_{SF}]e^{-t/\tau_S} - T_{SC})  \quad \text{Eq. 3}$$

The measured temperature, $T_1$, and the photosensor temperature, are also generally linearly related. In the illustrated system 50, however, during transitions, the presence of the capacitors $C_P$ and $C_S$ introduce nonlinearities into the relationship between the measured temperature and the temperature at the photosensor. Accordingly, while the measured temperature varies exponentially with time, it may due so with a different thermal time constant, $\tau_1$, such that:

$$T_1(t) = T_{1F} + (T_{10} - T_{1F})e^{-t/\tau_1} \quad \text{Eq. 4}$$

where $T_{10}$ is an initial temperature at the temperature sensor, $T_{1F}$ is a final stable temperature, $\tau_1$ is a thermal time constant, measured for each system, associated with the temperature change at the temperature sensor.

From Eq. 4, we can determine a time derivative of the temperature at the temperature sensor as:

$$\frac{d(T_1)}{dt} = -(T_{10} - T_{1F})\frac{e^{-t/\tau_1}}{\tau_1} \quad \text{Eq. 5}$$

Since the temperature at the photosensor and the temperature at the temperature sensor are linearly related outside of temperature transients, Eq. 3 can be rewritten as:

$$P_0(t) = K(T_{1F} + [T_{10} - T_{1F}]e^{-t/\tau_S} - T_{1C}) \quad \text{Eq. 6}$$

where $T_{1C}$ is the temperature for which the phase offset is calibrated to be zero.

Using Eq. 5, Eq. 6 can be rewritten as:

$$P_0(t) = K\left(T_{1F} - T_{1C} + \tau_1 \frac{d(T_1)}{dt} e^{-\left(\frac{t}{\tau_S} - \frac{t}{\tau_1}\right)}\right) \quad \text{Eq. 7}$$

It will be appreciated that the time derivative of the measured temperature can be determined numerically from the measured temperature data. In many systems, it can be assumed that the time constants for the temperature at the photosensor driver 52 and the temperature sensor 56 are reasonably similar in value, such the term $$\left(\frac{t}{\tau_S} - \frac{t}{\tau_1}\right)$$

is sufficiently close to zero to allow the exponential term to be linearly approximated near zero as $$1 - \left(\frac{t}{\tau_S} - \frac{t}{\tau_1}\right).$$

Accordingly, the model of Eq. 7 can be approximated as:

$$P_0(t) = K\left(T_{1F} - T_{1C} + \tau_1 \frac{d(T_1)}{dt}\left(1 - t\left(\frac{1}{\tau_S} - \frac{1}{\tau_1}\right)\right)\right) \quad \text{Eq. 8}$$

In other systems, it can be assumed that the time constants for the temperature at the photosensor driver 52 and the temperature sensor 56 are substantially similar in value, such that such the term $$\left(\frac{t}{\tau_S} - \frac{t}{\tau_1}\right)$$

is sufficiently close to zero to allow the exponential term to be ignored.

In this case, the model of Eq. 7 can be approximated as:

$$P_0(t) = K\left(T_{1F} - T_{1C} + \tau_1 \frac{d(T_1)}{dt}\right) \quad \text{Eq. 9}$$

It will be appreciated that the time constants, $\tau_1$ and $\tau_S$, as well as the constant K will differ among systems. To this end, FIGS. 3-6 graphically illustrate the determination of these parameters. In these examples, each parameter is determined via a curve fitting procedure applied to one of the models of Eqs. 7-9 for data collected from a reference system. It will be appreciate that, for systems different from that of FIG. 2 that additional or different parameters may be used within the general model.

FIG. 3 illustrates a chart 80 of calibration data obtained for calculating the static coefficient, K. The horizontal axis 82 represents a difference between a measured temperature at the temperature sensor and a calibrated temperature for which the phase offset is calibrated to be zero. The vertical axis 84 represents the change in the phase offset due to temperature. The phase is measured as a digital value for which 4096 units is equal to a full period (e.g., $2\pi$ radians). As can be seen from the chart 80, the plotted curve 86 is substantially linear. The static coefficient, K, can be determined as the slope of this curve or a line fitted to the curve, when the linear relationship is insufficient to extract a slope from the curve. Accordingly, the static coefficient represents an expected amount of change in the phase offset associated with a given deviation of the measured temperature from the calibration value when the temperature of the system is at a steady state, that is, not in transition.

Figure 4:
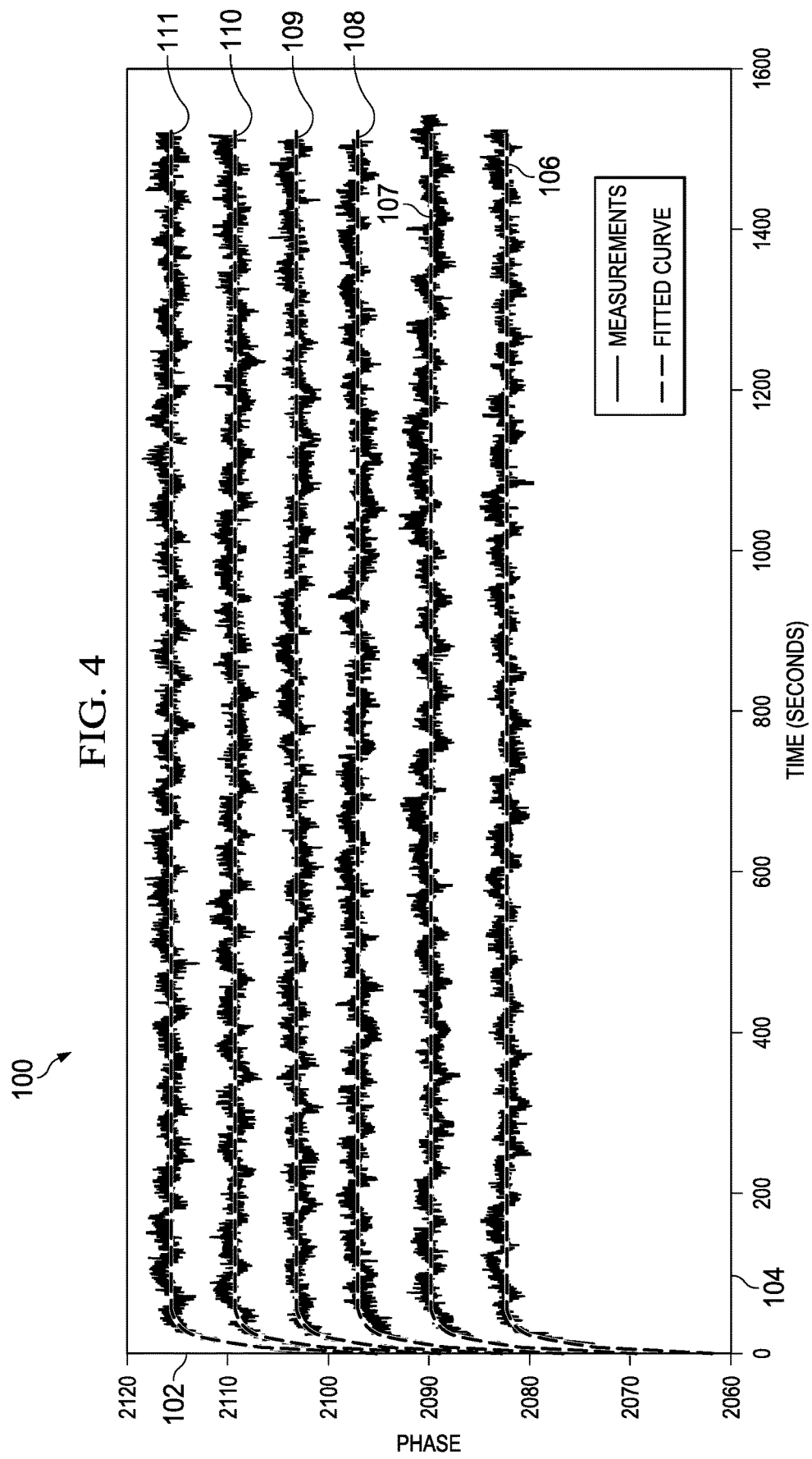
FIG. 4 illustrates a chart of calibration data obtained for determining a time constant, $\tau_s$, associated with a photosensor.

FIG. 4 illustrates a chart 100 of calibration data obtained for determining the time constant, $\tau_S$, of the temperature at the photosensor. The vertical axis 102 represents the phase offset, represented as a digital value for which 4096 units is equal to a full period (e.g., $2\pi$ radians). The horizontal axis 104 represents time, measured in seconds. Each dataset 106-111 represents data taken from the reference system at a specific temperature, specifically twenty-two degrees Celsius 106, twenty-four degrees Celsius 107, twenty-seven degrees Celsius 108, thirty degrees Celsius 109, thirty-three degrees Celsius 110, and thirty-five degrees Celsius 111. For each dataset 106-111, an exponential curve, $T_S(t) = T_{SF} + (T_{S0} - T_{SF})e^{-t/\tau_S}$, can be fitted to the dataset to obtain a time constant associated with the represented temperature. In the illustrated implementation, the time constant is substantially equal across temperatures, and the same value can be used across a temperature range of interest.

Figure 5:
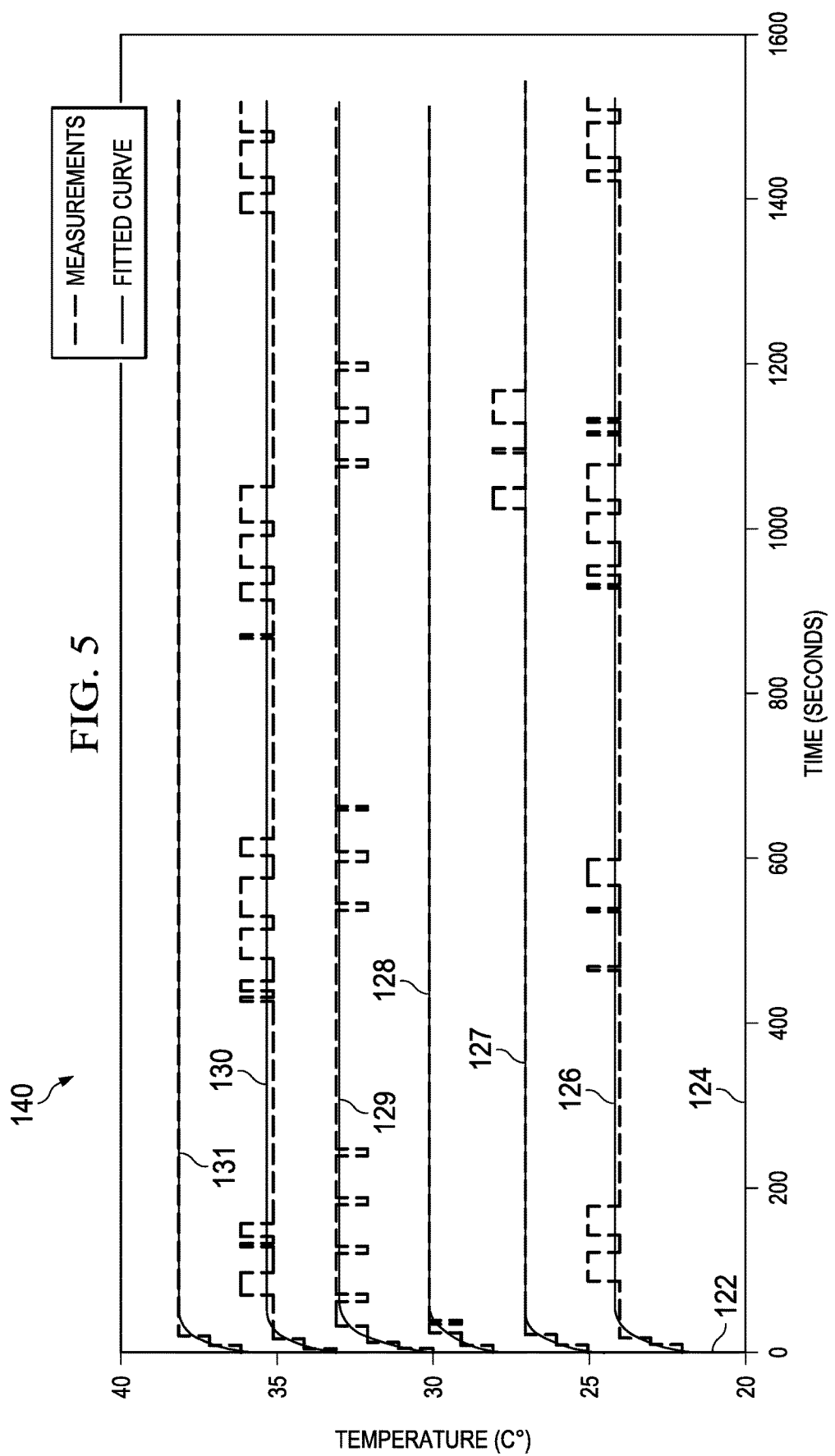
FIG. 5 illustrates a chart of calibration data obtained for determining a time constant, $\tau_1$, associated with a temperature sensor.

FIG. 5 illustrates a chart 120 of calibration data obtained for determining the time constant, $\tau_1$, of the temperature at the temperature sensor. The vertical axis 122 represents the measured temperature in Celsius. The horizontal axis 124 represents time, measured in seconds. Each dataset 126-131 represents data taken from the reference system at a specific temperature, specifically twenty-two degrees Celsius 126, twenty-four degrees Celsius 127, twenty-seven degrees Celsius 128, thirty degrees Celsius 129, thirty-three degrees Celsius 130, and thirty-five degrees Celsius 131. For each dataset 126-131, an exponential curve, $T_1(t)=T_{1F}+(T_{10}-T_{1F})e^{-t/\tau_1}$, can be fitted to the dataset to obtain a time constant associated with the represented temperature. In the illustrated implementation, the time constant is substantially equal across temperatures, and the same value can be used across a temperature range of interest.

Figure 6:
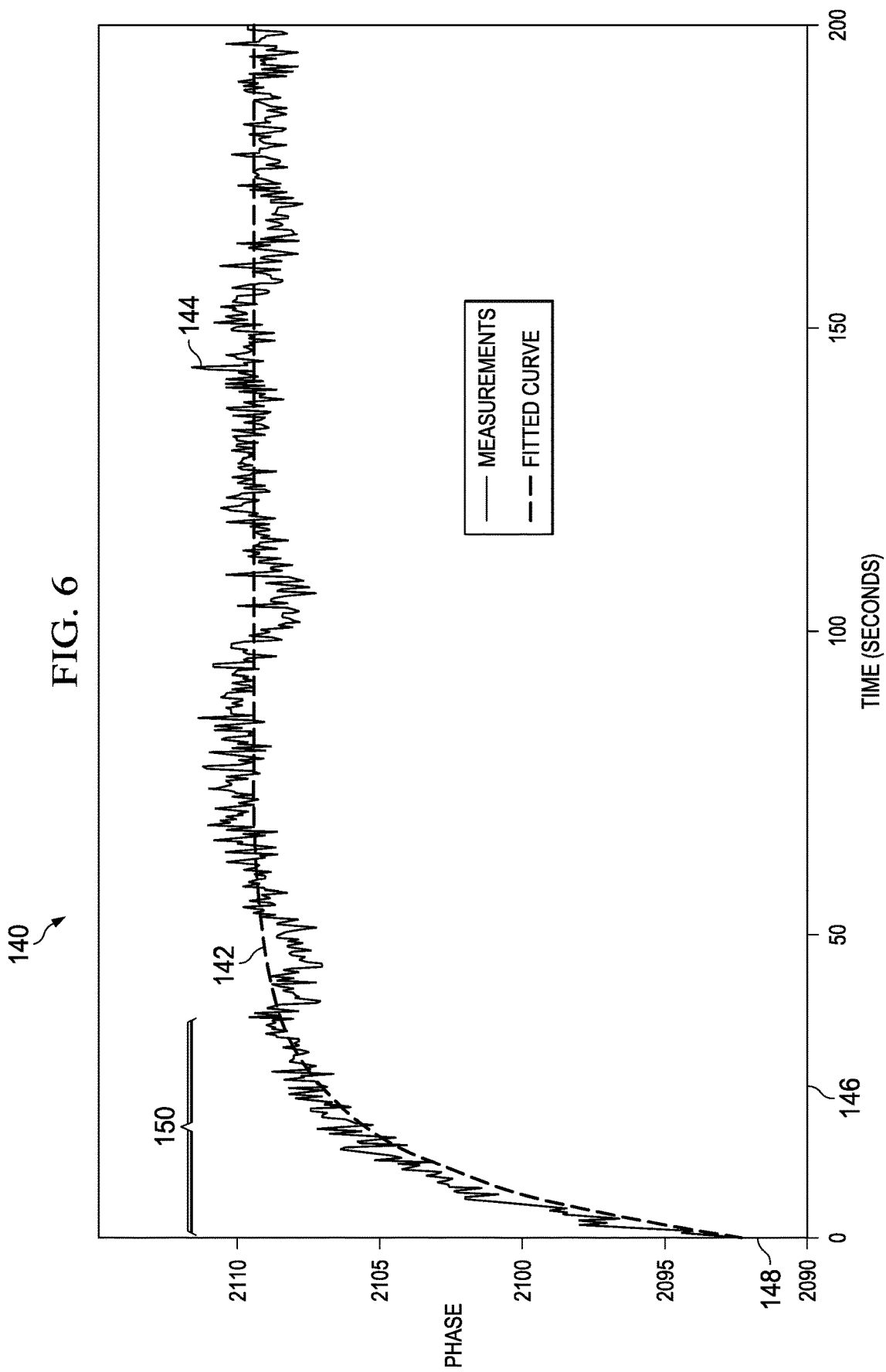
FIG. 6 illustrates a chart of a modeled phase offset for an example time of flight system and a measured phase offset.

FIG. 6 illustrates a chart 140 of a modeled phase offset 142 for an example time of flight system 142 and a measured phase offset 144. The vertical axis 146 represents the phase offset, represented as a digital value for which 4096 units is equal to a full period (e.g., $2\pi$ radians). The horizontal axis 148 represents time, measured in seconds. It can be seen from the chart 140 that the predicted value tracks closely with the measured value even during an initial transition 150, allowing for an increase in the accuracy of the time of flight calculation.

Figure 7:
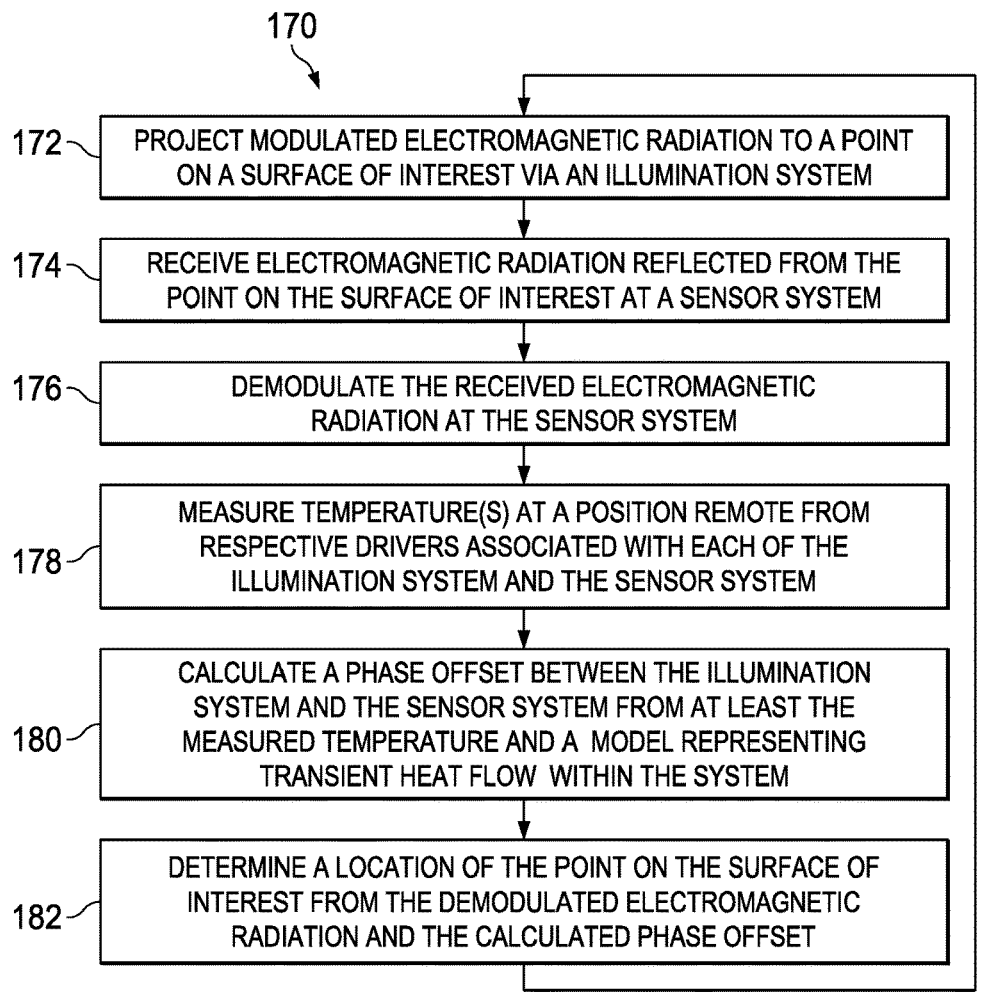
FIG. 7 illustrates an example method for determining a distance to a surface of interest.

In view of the foregoing structural and functional features described above, methods in accordance with various aspects of the present invention will be better appreciated with reference to FIG. 7. While, for purposes of simplicity of explanation, the method of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 7 illustrates an example of a method 170 for determining a distance to a surface of interest with a time of flight system. At 172, modulated electromagnetic radiation is projected to a point on the surface of interest via an illumination system. In one implementation, infrared light modulated to include a series of higher intensity pulses and directed at the surface of interest. At 174, electromagnetic radiation reflected from the point on the surface of interest is received at a sensor system. At 176, the received electromagnetic radiation is demodulated at the sensor system. At 178, a temperature is measured at a position remote from respective drivers associated with each of the illumination system and the sensor system. By "remote from," it is meant that there is a sufficient spatial separation that a temperature change at a driver will not be instantaneously measured at the temperature sensor. For example, a temperature sensor located on a same circuit board as one or both of the sensor driver and the illumination driver, but spatially removed from both components, can be used to measure the temperature.

At 180, a phase offset between the illumination system and the sensor system is calculated from at least the measured temperature and a model representing transient heat flow within the system. In one implementation, the model can include a time derivative of the measured temperature, such that calculating the phase offset includes calculating a numerical derivative of the measured temperature for at least one time. Depending on the specifics of the system, the model can include one or more of a nonlinear function of a time since a transition in temperature has begun, a product of the time derivative of the measured temperature and a linear term representing the time since the transition began, and a linear combination the time derivative of the measured temperature, a final stable temperature at the temperature sensor after transition in temperature, and a calibration temperature for the temperature sensor at which the phase offset is expected to be zero.

It will be appreciated that a given model can be parameterized for a general class of systems. To this end, the method can include an additional step of determining a plurality of system parameters for the model from a reference system via a curve fitting analysis. (not shown). In one implementation, the plurality of system parameters can include a calibration temperature for the measured temperature at which the phase offset is expected to be zero, a thermal time constant associated with the driver associated with the sensor system, a thermal time constant associated with the driver associated with the illumination system, a thermal time constant associated with the driver associated with each temperature sensor, and a static coefficient representing an expected amount of change in the phase offset associated with a given deviation of the measured temperature from the calibration value when the temperature of the system is not in transition. At 182, a location of the point on the surface of interest, relative to the time of flight system, is determined from the received electromagnetic radiation and the calculated phase offset.

It will be appreciated that the method, including 172, 174, 176, 178, 180, and 182, can be iteratively repeated to provide locations of multiple locations on the surface of interest. It will be appreciated that the calculated phase offset at 180 can be refined over time to reflective changes in temperature as the time of flight system is operating. In one implementation, measured temperatures from 178 can be retained across iterations and utilized to provide a more accurate calculation of the phase offset at 180. For example, multiple temperature readings over time can be used to calculate a numerical derivative as part of the phase offset calculation.

Figure 8:
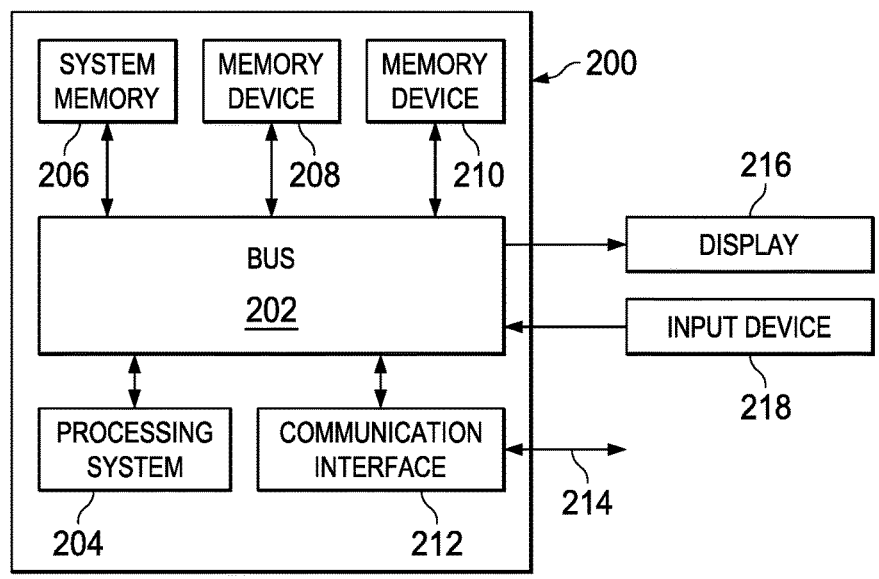
FIG. 8 is a schematic block diagram illustrating an exemplary system of hardware components capable of implementing examples of the systems and methods disclosed in FIGS. 1-7.

FIG. 8 is a schematic block diagram illustrating an exemplary system 200 of hardware components capable of implementing examples of the systems and methods disclosed in FIGS. 1-7, such as time of flight compensation component 24 and the compensation component 26. The system 200 can include various systems and subsystems. The system 200 can be a personal computer, a laptop computer, a workstation, a computer system, an appliance, a "smart" phone, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a time of flight measurement system. Computer executable logic for implementing the system control 126 resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can include either a single medium or multiple non-transitory media operatively connected to the processing unit 204.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed.

The invention claimed is:

1. A time of flight system comprising:
    an illumination system, comprising an illumination driver and an illumination source, configured to project modulated electromagnetic radiation to a point on a surface of interest;
    a sensor system, comprising a sensor driver, configured to receive and demodulate electromagnetic radiation reflected from the surface of interest; and
    a temperature sensor configured to provide a measured temperature representing a temperature at one of the illumination driver and the sensor driver, the temperature sensor being located at a position remote from the one of the illumination driver and the sensor driver such that a change in temperature at the one of the illumination driver and the sensor driver is not instantaneously detected at the temperature sensor;
    wherein a phase offset between the illumination system and the sensor system from at least the measured temperature and a model representing transient heat flow within the system is calculated; and
    wherein the model represents the phase offset as a function of a time derivative of the measured temperature such that the compensation component is configured to calculate a numerical representation of the time derivative of the measured temperature for at least one time.

2. The time of flight system of claim 1, wherein the model represents the phase offset as a linear combination of a time derivative of the measured temperature, a final stable temperature at the temperature sensor after transition in temperature, and a calibration temperature for the temperature sensor at which the phase offset is expected to be zero.

3. The time of flight system of claim 2, wherein the linear combination comprises a product of a static coefficient with a difference between the final stable temperature and the calibration model, the static coefficient representing an expected amount of change in the phase offset associated with a given deviation of the measured temperature from the calibration value when the temperature of the system is not in transition.

4. The time of flight system of claim 2, wherein the linear combination comprises a product of the time derivative of the measured temperature and a thermal time constant associated with the temperature sensor.

5. The time of flight system of claim 2, wherein the linear combination comprises a product of the time derivative of the measured temperature, a thermal time constant associated with the temperature sensor, and a term linearly dependent on a time since the beginning of a transition in temperature.

6. The time of flight system of claim 5, wherein the linearly dependent term comprises the different between one and a product of the time since the beginning of a transition in temperature and a difference between the respective multiplicative inverses of the thermal time constant associated with the temperature sensor and a thermal time constant associated with the sensor driver.

7. The time of flight system of claim 1, wherein the temperature sensor is a first temperature sensor configured to provide a first measured temperature and the system further comprising a second temperature sensor configured to provide a second measured temperature, the model representing the phase offset as a function of the first measured temperature and a second measured temperature.

8. The time of flight system of claim 7, wherein the model representing the phase offset as a function of each of first measured temperature, the second measured temperature, a thermal time constant associated with the first temperature sensor, a thermal time constant associated with the second temperature sensor, a thermal time constant associated with the sensor driver, and a thermal time constant associated with the receiver driver.

* * * * *